United States Patent [19]
DeKlotz

[11] Patent Number: 6,068,324
[45] Date of Patent: May 30, 2000

[54] CARGO SYSTEM INCLUDING MULTIPLE FUNCTION SEALING PASSAGES

[76] Inventor: Ralph E. DeKlotz, 4288 S. Rimview Way, Boise, Id. 83716

[21] Appl. No.: 09/148,106

[22] Filed: Sep. 4, 1998

[51] Int. Cl.[7] ................................................. B60P 7/02
[52] U.S. Cl. .......................... 296/100.06; 296/10; 296/61
[58] Field of Search ............................ 296/50, 56, 57.1, 296/61, 100.02, 100.06, 146.8, 146.9, 146.11, 146.12, 10; 49/398, 381, 498.1, 501, 192; 16/221

[56] References Cited

U.S. PATENT DOCUMENTS

| | | | |
|---|---|---|---|
| 3,536,352 | 10/1970 | Beckley | 296/100.02 X |
| 3,548,540 | 12/1970 | Cullings | 296/50 X |
| 3,995,890 | 12/1976 | Fletcher | 296/10 |
| 4,475,761 | 10/1984 | Milroy et al. | 296/61 |
| 5,518,288 | 5/1996 | DeKlotz | 296/100 |
| 5,845,952 | 12/1998 | Albertini et al. | 296/100.02 X |

*Primary Examiner*—D. Glenn Dayoan
*Assistant Examiner*—Jason Morrow
*Attorney, Agent, or Firm*—Joseph W Holland

[57] ABSTRACT

The cargo system according to the present invention may include a roof passage having a weather tight hinging mechanism. A roof passage panel is configured having an "h-shaped" edge member pivotably attached to a hinge allowing for movement of the panel between a first or closed position wherein the hinge mechanism is sealed in a weather tight manner, a second or "up-opened" position wherein the roof passage panel is oriented in a substantially vertical position above the roofline of the cargo system, and a third or "down-opened" position, wherein the roof panel is oriented again in a substantially vertical position below the roofline of the cargo system. The cargo system including multiple function sealing passages may also include a ramp/hatch passage which allows access to the cargo system, typically via the rear panel. The ramp/hatch passage is configured to permit access to the bed of the vehicle via the ramp/hatch passage, which may be opened as a hatch or alternately as a ramp.

6 Claims, 10 Drawing Sheets

CARGO SYSTEM INCLUDING MULTIPLE FUNCTION SEALING PASSAGES

BACKGROUND OF THE INVENTION

1. Technical Field.

This invention relates to a cargo system for a transport vehicle and more particularly to a cargo system including multiple function sealing passages.

2. Background.

It is often desirable to enclose the load contained in the bed of a pickup truck. The bed of a pickup truck can be enclosed either for utilization as a sheltered and secured space for camping or other recreational uses, or for cargo transport and storage. In addition to traditional "camper" shells, a number of enclosures exist for pickup load beds. One such device is shown in U.S. Pat. No. 5,518,288 to DeKlotz for a multiple configuration cargo system for pickup trucks. DeKlotz discloses a hinged roof panel system which permits the roof of the cargo system to be opened to accept loads which otherwise would not fit within the cargo system. DeKlotz also discloses a ramp assembly which attaches to the vehicle for deployment for loading and unloading purposes. The ramp allows only for access to the cargo area in a ramp down position.

It would be desirable to provide a roof passage having a weather tight hinge assembly, which allows for movement of the roof passage panel between a range of positions including a closed position, typically a substantially horizontal position wherein the hinge mechanism is sealed in a weather tight manner; an "up-opened" position wherein the roof passage panel is oriented in a substantially vertical position above the roofline of the cargo system; and a "down-opened" position oriented also in a substantially vertical position. It would also be desirable to provide a rear access passage which would allow for access into the cargo area with the rear panel lifted upward as a hatch or lowered downward in a ramp configuration.

SUMMARY OF THE INVENTION

These and other objects are achieved by a cargo system including multiple function sealing passages including a pair of side panels and a pair of rear panels. The rear panels are connected to the side panels at the corners of the cargo system. The cargo system including multiple function sealing passages may also include a front panel which is attached along either of its side edges to the side panels. According to the present invention, the cargo system may also include a roof passage including a weather tight hinging mechanism. A weather tight passage includes a weather tight passage frame having an angular frame member including a foot extending in a first plane and a leg connected to the foot and extending in a second plane. The weather tight passage frame also includes a hinge attached to the angular frame member foot and a sealing element attached to the angular frame edge member leg. The sealing element may be formed of a one piece self sealing weather-strip typically formed of rubber or a synthetic material and commonly used in the automotive manufacturing industry.

A panel having an outer edge including an underside is configured to have an h-shaped edge member including a first leg attached to the panel near the outer edge and extending from the panel, and a second leg attached to and extending from the first leg, the second leg lying in a plane substantially parallel to the panel outer edge, the h-shaped panel member second leg pivotally attached to the hinge, for movement between (1) a closed weather tight orientation wherein the panel extends substantially parallel to the first plane, with the panel outer edge substantially perpendicular to the angular frame member leg and the underside of the outer edge compressively contacting the sealing element, (2) an up-opened orientation wherein the panel extends above the first plane at an angle to the first plane, and (3) a down-opened orientation wherein the panel extends below the first plane at an angle to the first plane.

The cargo system including multiple function sealing passages may also include a ramp/hatch passage which allows access to the cargo system, typically via the rear panel. The combination ramp/hatch passage may include a rear passage frame having a first side frame element and a second side frame element and an upper end and a lower end.

An upper pivot release member includes a first upper pivot release element and a second upper pivot release element. The first pivot release element is attached at the upper end of the passage. The combination ramp/hatch passage also includes a lower pivot release member having a first lower pivot release element and a second lower pivot release element. The first lower pivot release element is attached at the lower end of the passage. The combination ramp/hatch passage also includes a closure panel including an upper end, a lower end, a first side and a second side. The second upper pivot release element is attached near the upper end of the closure panel for pivotably and releaseably engaging the first upper pivot release element and the second lower pivot release element attached near the lower end of the closure panel for pivotably and releaseably engaging the first lower pivot release element.

In one embodiment of the invention, the upper pivot release member includes a first upper pivot element attached near the upper end of the passage frame first side frame element, a second upper pivot element attached near the upper end of the passage frame second side frame element, a first upper latch element attached near the upper end of the closure panel for pivotably and releaseably engaging the first upper pivot element and a second upper latch element attached near the upper end of the closure panel for pivotably and releaseably engaging the first upper pivot element. The upper pivot release member includes a first lower latch element attached near the lower end of the passage frame first side frame element, a first lower latch element attached near the lower end of the passage frame first side frame element, a first lower pivot element attached near the lower end of the closure panel for pivotably and releaseably engaging the first lower latch element and a second lower pivot element attached near the lower end of the closure panel second side for pivotably and releaseably engaging the second lower latch element. Each latch element may be operatively connected to a release linkage. Each pivot member cooperates with a latch member providing a pivotable and releasable point of attachment for the upper and lower end of the closure panel. In one embodiment of the invention, a pair of No.11445-16 two rotor latches are used for the upper latch members and a pair of No.10339-16 strikes are used for the upper pivot members. Similarly, a No.11442-16 two rotor latch and a No.11443-16 two rotor latch are used for the lower latch members and a pair of No.10339-16 strikes are used for the lower pivot members. All listed latches and strikes are manufactured by the Austin Hardware, Inc.

The latch members may be operated via their release mechanism to release alternately the upper pivot release member allowing the upper end of the closure panel to be lowered as a ramp or the lower pivot release member to release the lower end of the closure panel allowing the panel to be opened as a hatch.

The ramp/hatch passage may also include a ramp panel hingedly attached to the upper edge of the closure panel. When the ramp/hatch passage is deployed as a ramp, the ramp panel extends pivotally from the upper end of the closure panel allowing for an extended ramp. The ramp/hatch passage may also include a pair of auxiliary legs hingedly attached at the juncture of the closure panel and the ramp panel. The auxiliary legs swing down when the panels are deployed as a ramp supporting the ramp at a midpoint.

The ramp/hatch passage may also include one or more compressed air struts which assist in both raising the ramp/hatch as a hatch and lowering the ramp/hatch as a ramp. In one embodiment of the invention, a pair of compressed gas struts having a 100 pound lifting force and a 16.14 inch travel are employed for raising the ramp/hatch as a hatch and lowering the ramp/hatch as a ramp.

In one embodiment of the cargo system according to the present invention, the first end of the compressed air strut may be pivotally attached to the lower end of the first side frame element of the ramp/hatch passage frame. The second end of the strut is attached above the midpoint of the closure panel, along the side edge of the closure panel.

The cargo system according to the present invention may also include a roof panel cross brace which is removably attached to the pair of rear cargo panels. The roof panel cross brace may be configured to provide a seal between the rear edge of the roof passage panel and the roof panel cross brace. The roof panel cross brace may also be configured to provide a seal between the upper edge of the ramp/hatch and the roof panel cross brace.

The cargo system according to the present invention may also include a flip seal, located towards the front edge of the roof passage. The flip seal provides a weather tight seal along the front edge of each of the roof panels. The flip seal is designed so that, once the roof panels are opened and in an upright position, the flip seal may be pivoted in such a manner to allow the roof panels to swing down into a down, open door orientation wherein the panels extend below the first plane.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Referring now to the Figures, the cargo system including multiple function sealing passages according to the present invention will be more completely described.

Figure 1:
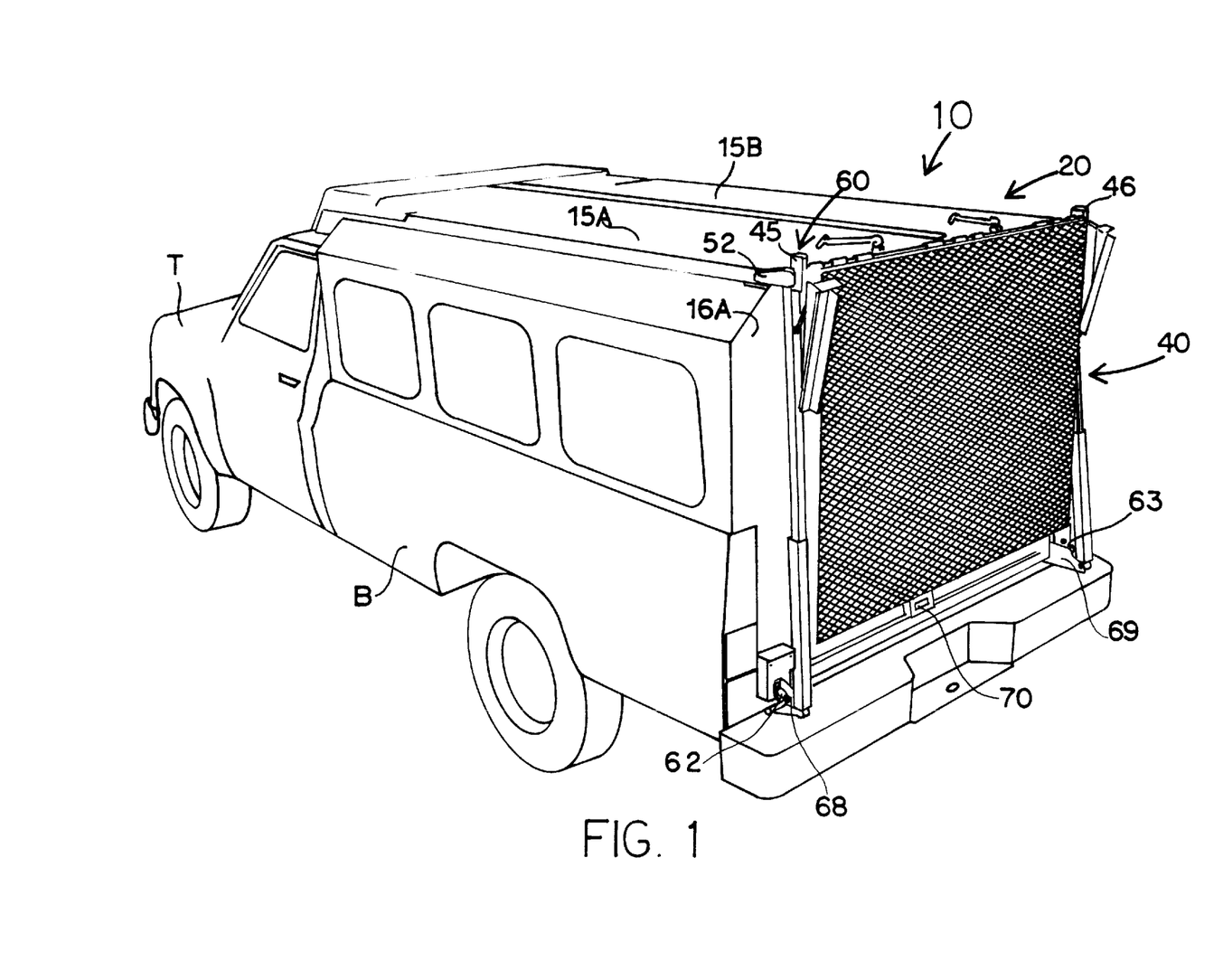
FIG. 1 is a perspective representational view of a pickup truck including a cargo system including multiple function sealing passages according to the present invention.
Figure 3:
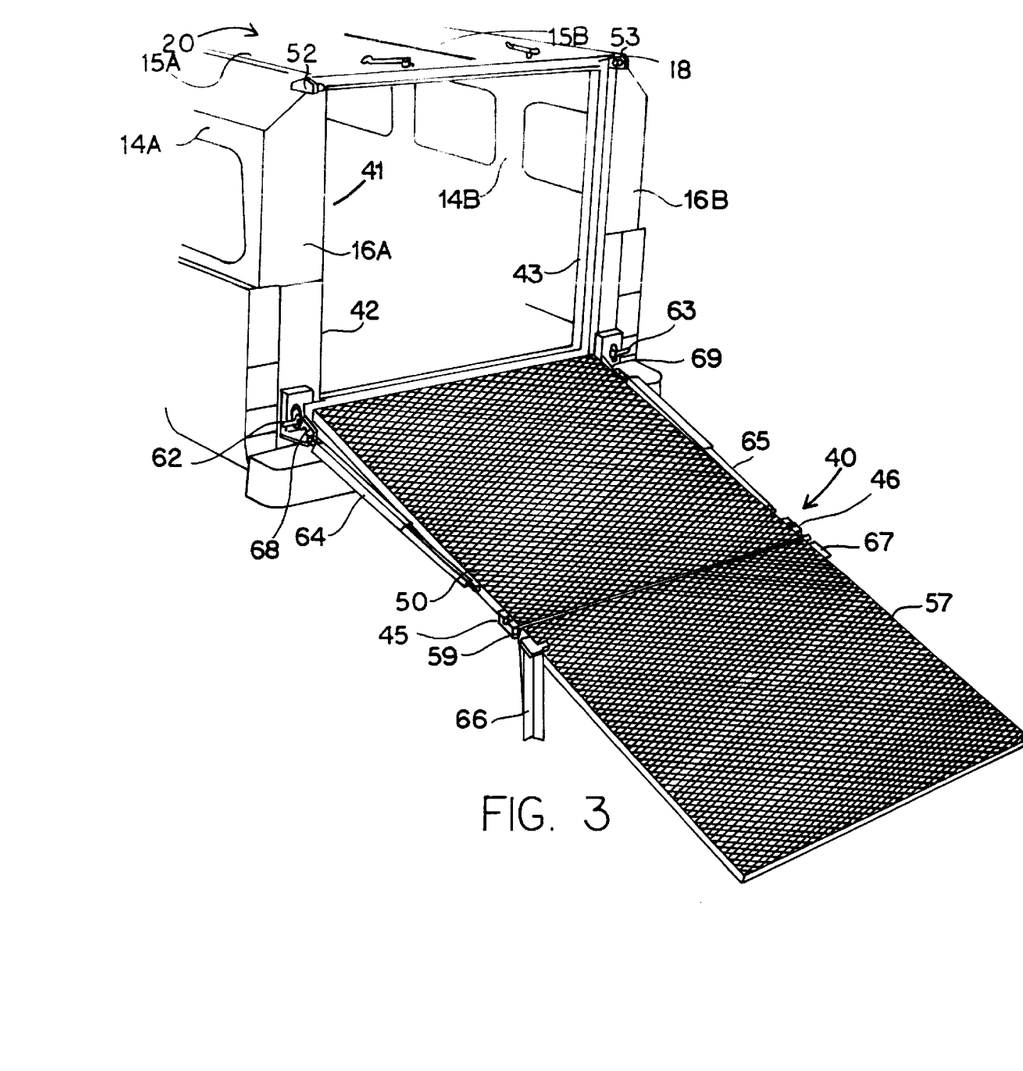
FIG. 3 is a perspective representational drawing of the cargo system including multiple function sealing passages with the hatch/ramp being deployed in the ramp configuration.

Referring to FIG. 1, pickup truck T is shown having bed B upon which cargo system 10 is removably mounted. Cargo system 10 includes first side panel 14A, shown in FIG. 1, and second side panel 14B, shown in FIG. 3. Cargo system 10 also includes first roof panel 15A and second roof panel 15B. Cargo system 10 also includes first rear panel 16A, shown in FIG. 1, and second rear panel 16B shown in FIG. 3. Cargo system 10 also includes front panel 17 shown in FIG. 7. As shown in FIG. 3, cargo system 10 may also include roof panel cross brace 18.

Cargo system 10, as shown in FIG. 1, may also include weather tight passage 20 and combination ramp/hatch 40. FIG. 1 shows ramp/hatch 40 being released by ramp latch release 70.

Figure 2:
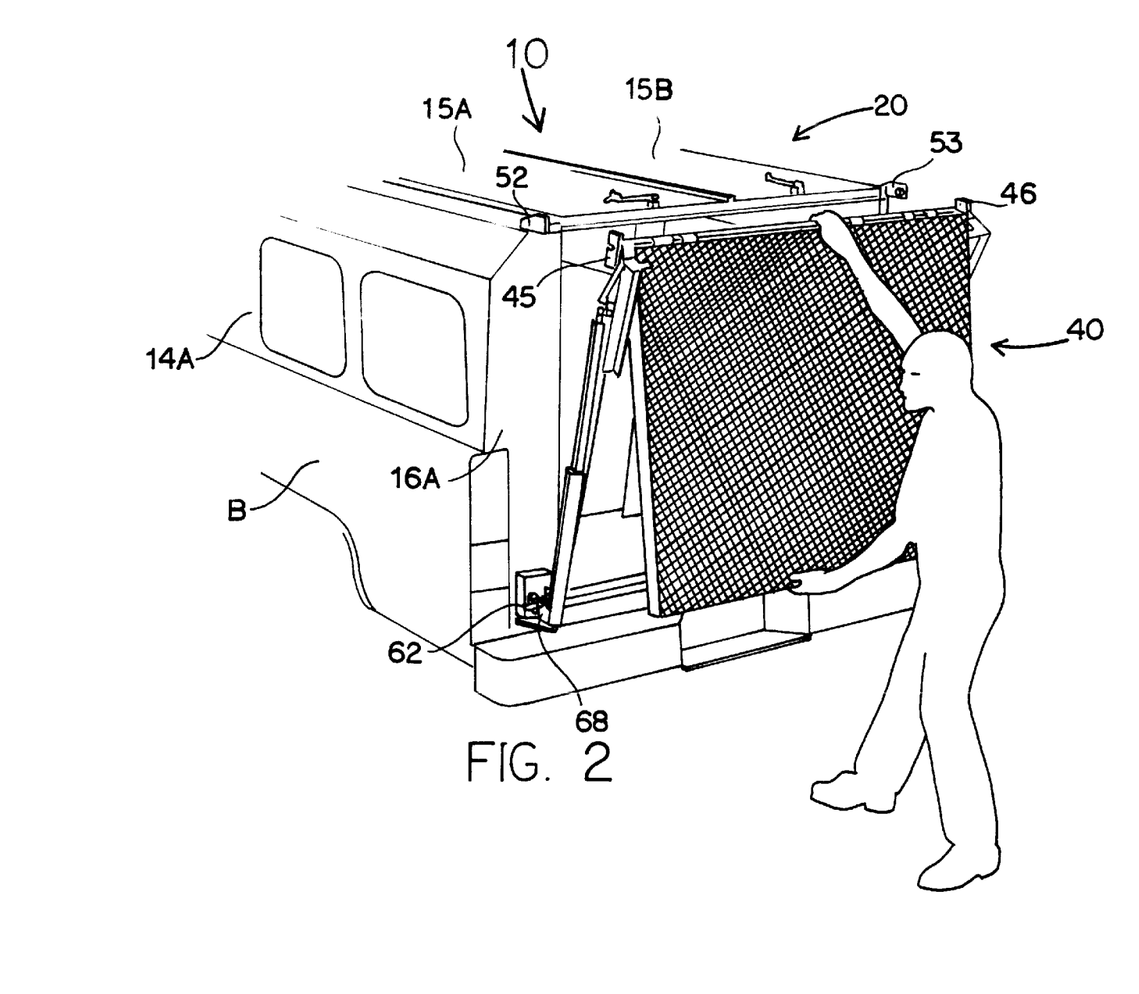
FIG. 2 is a perspective representational drawing of the cargo system including multiple function sealing passages with the hatch/ramp being deployed in the ramp configuration

Referring to FIG. 2, cargo system 10 is shown having weather tight passage 20 and combination ramp/hatch 40. FIG. 2 also shows first roof panel 15A and second roof panel 15B and first side panel 14A. First rear panel 16A is shown connected to first side panel 14A. Combination ramp/hatch 40 is shown in a partially open manner.

FIG. 3 shows combination ramp/hatch 40 opened in a fully extended ramp configuration. Combination ramp/hatch 40 includes passage frame 41 which is connected to first rear panel 16A and second rear panel 16B. Passage frame 41 includes first side frame element 42 and second side frame element 43.

Cargo system 10 is also shown including first roof panel 15A and second roof panel 15B, first side panel 14A and second side panel 14B. Roof panel cross brace 18 is also shown extending between first side panel 14A and second side panel 14B.

Combination ramp/hatch 40 includes closure panel 50 and ramp panel 57, hingedly connected to closure panel 50 at hinge 59. Ramp/hatch 40 is shown extended in a ramp configuration with first auxiliary leg 66 and second auxiliary leg 67 supporting the midpoint of combination ramp/hatch 40.

Figure 4:
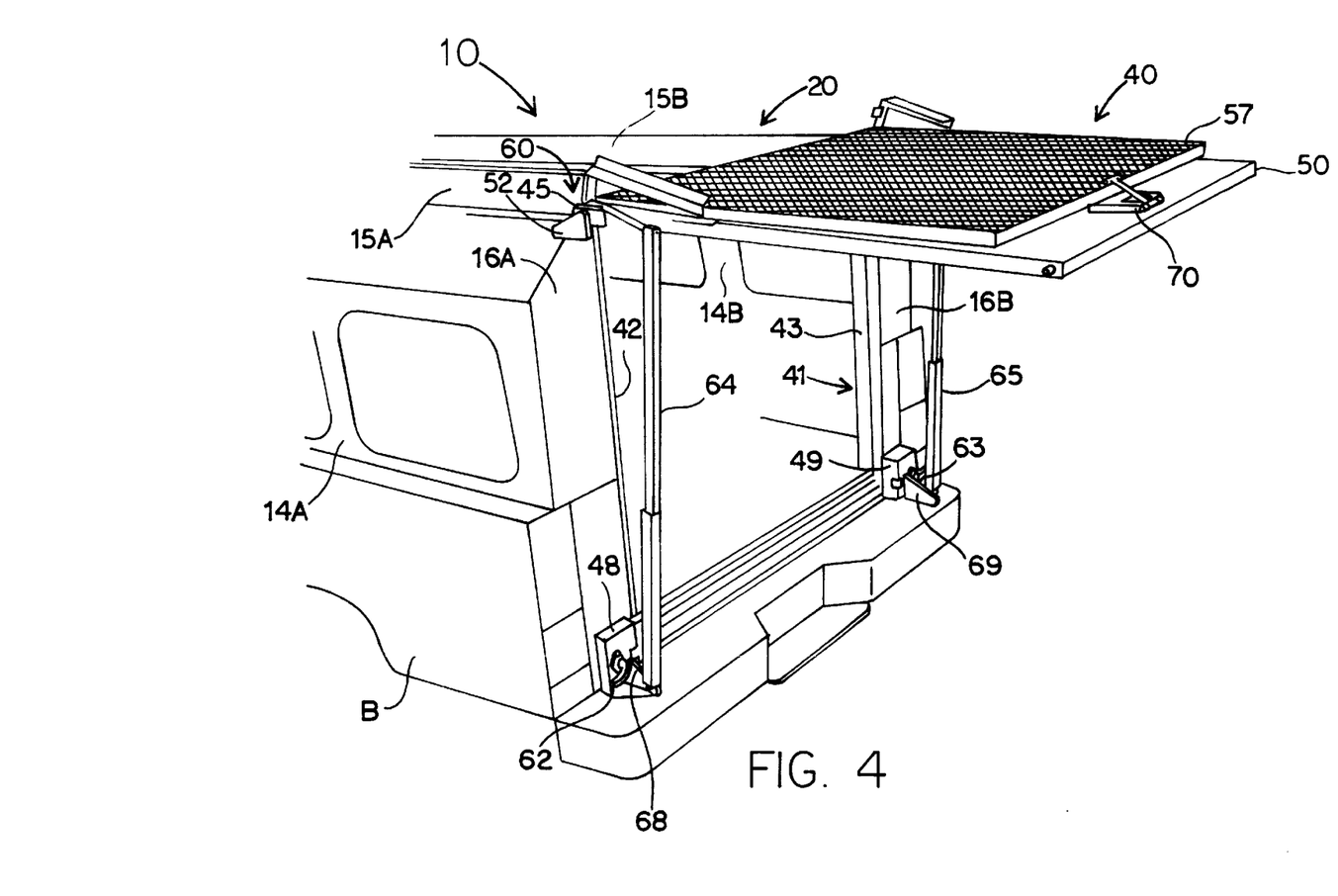
FIG. 4 is a perspective representational drawing of the cargo system including multiple function sealing passages with the hatch/ramp deployed in the hatch configuration.

Referring to FIG. 4, cargo system 10 is shown generally having weather tight passage 20 including first roof panel 15A and second roof panel 15B. Cargo system 10 also includes first side panel 14A and second side panel 14B, first rear panel 16A and second rear panel 16B.

FIG. 4 shows combination ramp/hatch 40 opened in a hatch configuration. Combination ramp/hatch 40 is shown including closure panel 50 and ramp panel 57. FIG. 4 also shows ramp/hatch 40 pivotally and releasably attaches to passage frame 41 at first upper pivot release member 60 including first upper latch element 45 and first upper pivot element 52.

FIG. 4 shows first lower latch element 48 attached at the lower end of first rear panel 16A. Similarly, second lower latch element 49 is attached near the lower end of second rear panel 16B. Operatively connected to first lower latch element 48 is first hatch release member 62. Similarly, operatively connected to second lower latch element 49 is second hatch release member 63.

Also shown in FIG. 4 are first strut 64 and second strut 65 pivotally attached near the lower ends of first rear panel 16A and second rear panel 16B respectively. Similarly, the upper ends of first strut 64 and second strut 65 are pivotally attached to the first and second sides of closure panel 50 respectively.

FIG. 4 shows to advantage passage frame 41 including first side frame element 42 and second side frame element 43.

Figure 5:
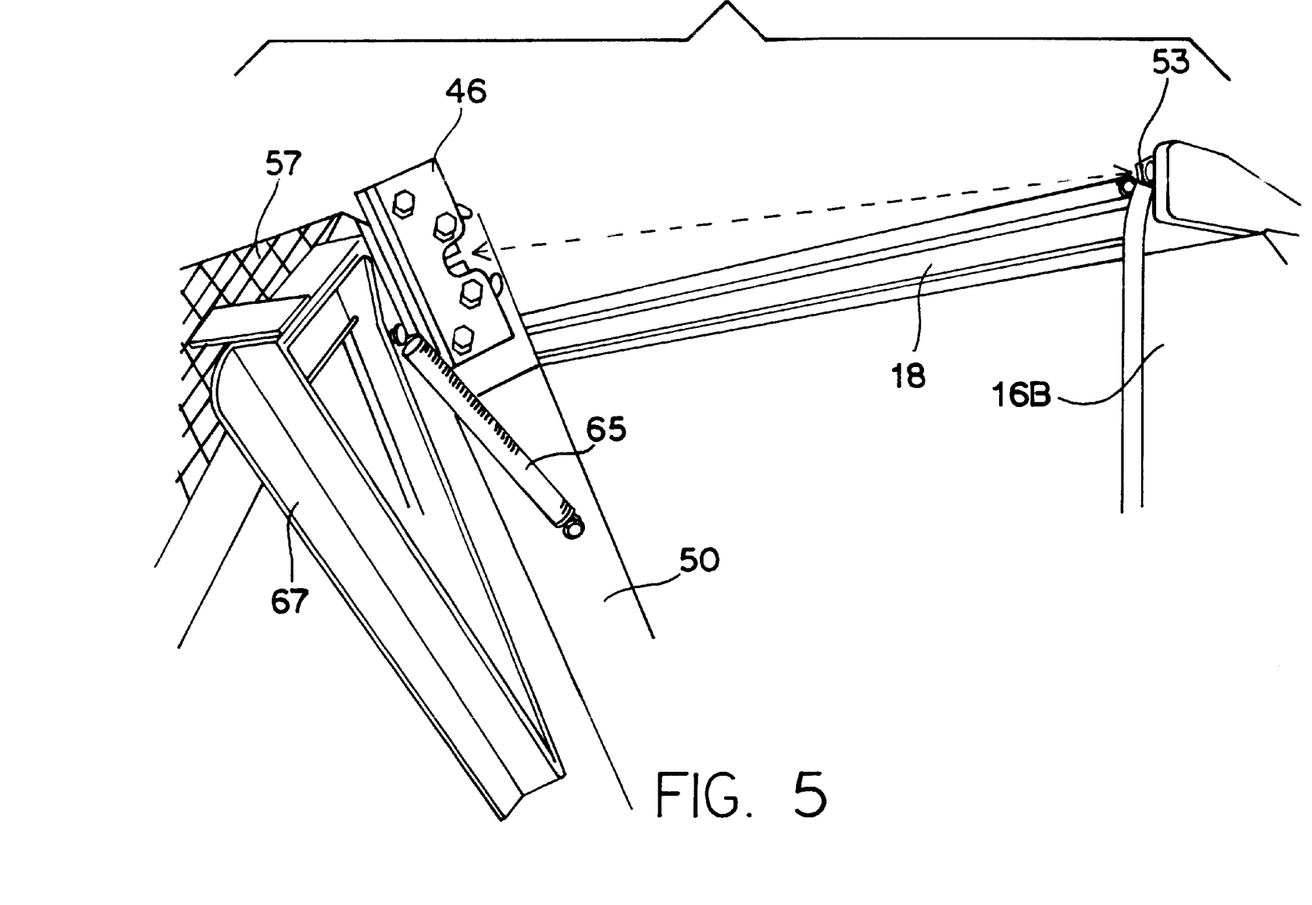
FIG. 5 is a detail showing an upper latching element and an upper pivot member.

FIG. 5 is a detail that shows second upper pivot release member 61 including second upper latch element 46 and second upper pivot element 53. Specifically, FIG. 5 shows second upper latch element 46 shown attached near the top edge and to the second side of closure panel 50. Second upper pivot element 53 is shown attached near the upper end of rear panel 16B.

FIG. 5 also shows the relationship of ramp panel 57 to closure panel 50 and the attachment of second auxiliary leg 67 to ramp panel 57. Finally, shown in FIG. 5, the upper end of second strut 65 is shown pivotally attached to closure panel 50. Panel cross brace 18 is shown attached to and extending from second rear panel 16B.

Figure 6:
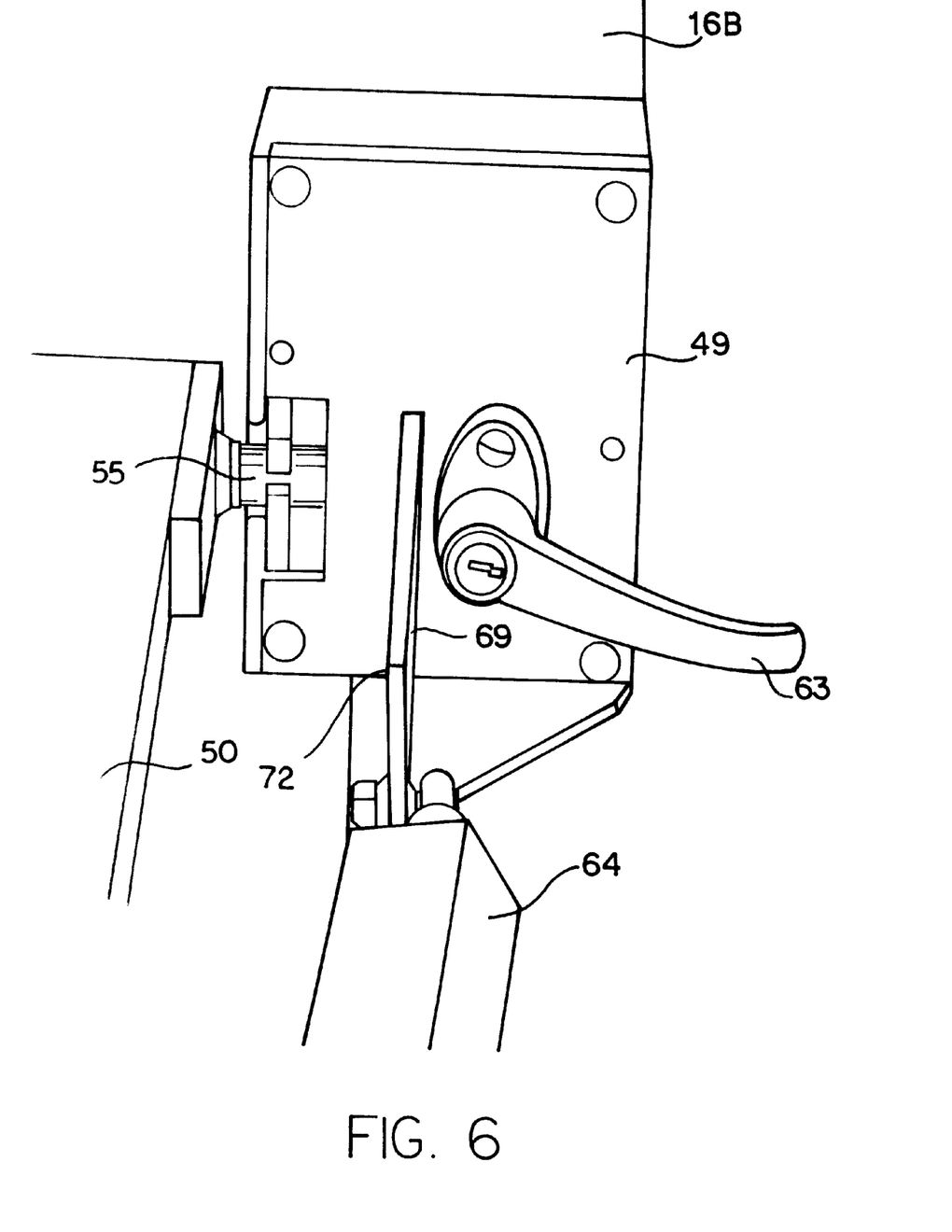
FIG. 6 is a detail of a lower latch mechanism showing the latch and a lower pivot member.

A detail of second lower latch element 49 is shown in FIG. 6. Second lower latch element 49 shown attached near the lower end of first rear panel 16B. Second lower pivot element 55 is shown attached at the lower end of closure panel 50. Second lower latch element 49 is operatively connected to second hatch release member 63.

FIG. 6 also shows second strut 65 pivotally attached at its second end to an attachment point located on second strut ear 69 near the lower end of first rear panel 16A.

Figure 7:
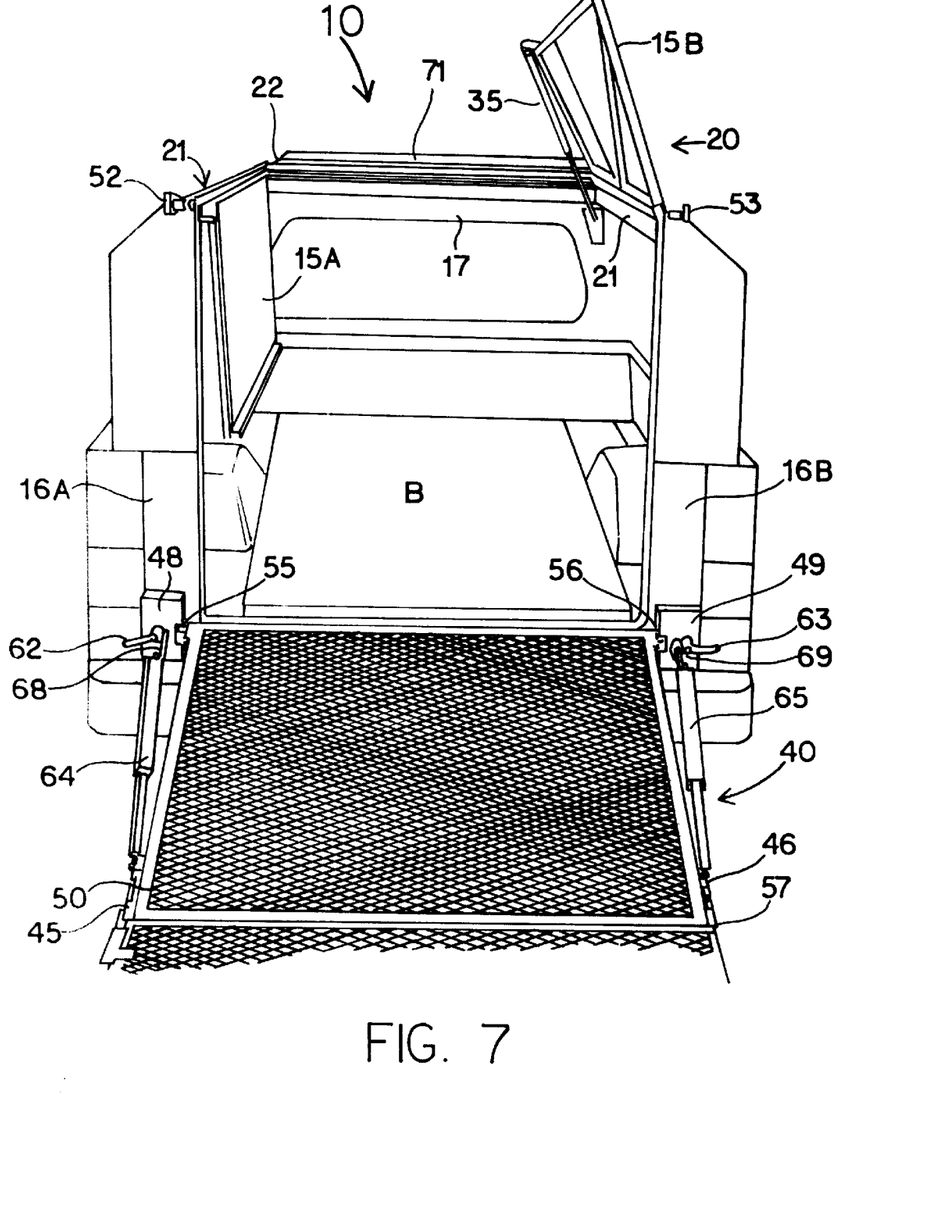
FIG. 7 is a perspective representational rear view of the cargo system including multiple function sealing passages with the hatch/ramp panel deployed as a ramp and the pair of roof panels, one deployed in an up-open orientation and the second deployed in the down-open orientation.

Referring to FIG. 7, cargo system 10 is shown removably mounted within truck bed B. Cargo system 10 includes generally weather tight passage 20 and Combination ramp/hatch 40. Combination ramp/hatch 40 includes closure panel 50 and ramp panel 57. Ramp/hatch 40 is shown in FIG. 7 deployed in a ramp configuration. Closure panel 50 is pivotally attached at first lower pivot element 55 to first lower latch element 48 and at second lower pivot element 56 to second lower latch element 49. First hatch release 62 and second hatch release 63 are also shown in FIG. 7.

FIG. 7 also shows first strut 64 having its lower end pivotally attached near the lower end of rear panel 16A and its upper end pivotally attached near the upper end of and to the first side of closure panel 50. Similarly, second strut 65 has its lower end pivotally attached near the lower end of second rear panel 16B and its upper end pivotally attached near the upper end of and to the first side of closure panel 50.

Also shown in FIG. 7 is first roof panel 15A deployed in a down-opened orientation wherein first roof panel 15A extends below the elevation of weather tight hinging mechanism 21. Also shown in FIG. 7 is second roof panel 15B deployed in an up-opened orientation wherein the panel extends above weather tight hinging mechanism 21. Second roof panel 15B is also shown supported by roof passage door strut 35. Also shown in FIG. 7 are first upper pivot element 52 located near the upper end of first rear panel 16A and second upper pivot element 53 located near the upper end of second rear panel 16B. Front panel 17 is also depicted in FIG. 7 extending across the front end of cargo system 10.

FIG. 7 also shows first strut 64 attached at its lower end to first strut ear 68 and second strut 65 attached at its lower end to second strut ear 69. First strut 64 is attached at its upper end the first side of closure panel 50. Similarly, second strut 65 is attached at its upper end the second side of closure panel 50.

FIG. 7 also shows flip seal 71 shown located along the front edge of the passageway formed by first roof panel 15A and second roof panel 15B.

Figure 8A:
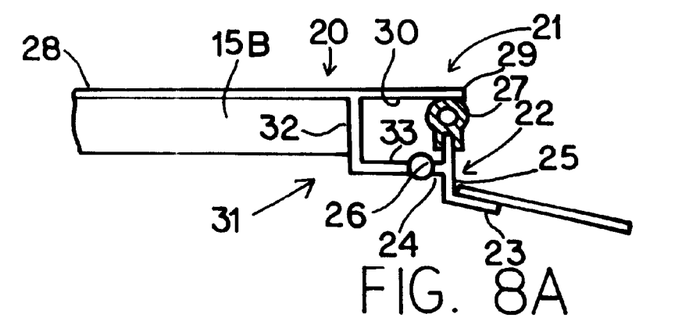
FIG. 8A is an end cross sectional representational view of a roof panel deployed in a first weather tight position.
Figure 8B:
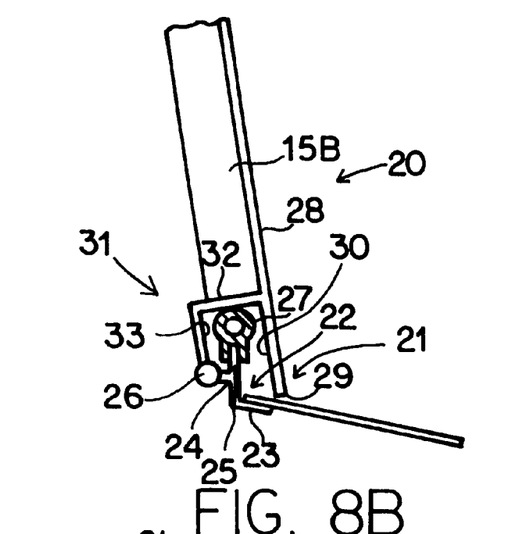
FIG. 8B is a detail cross sectional representational view of the roof panel deployed in an up-open position.
Figure 8C:
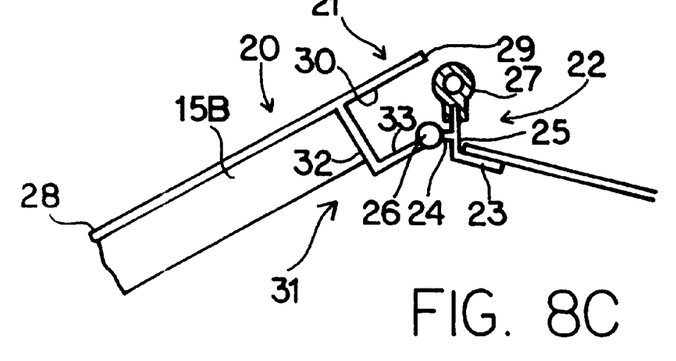
FIG. 8C is a detail and representational view of a roof panel deployed in a down-open orientation.

Referring to FIGS. 8A, 8B and 8C, operation of weather tight passage 20 with its weather tight hinging mechanism 21 is more fully described.

FIG. 8A shows second roof panel 15B of weather tight passage 20 oriented in a first or closed weather tight orientation wherein passage panel 28 extends in a first or substantially horizontal plane. Weather tight passage 20 includes frame 22 which forms generally the periphery of weather tight passage 20. Weather tight passage 20 includes a weather tight hinging mechanism shown generally at 21. Frame 22 is configured having angular frame member 23 which includes foot 24 that extends away from angular frame member 23 in a substantially horizontal or first plane. Frame 22 also includes leg 25 which extends in a substantially vertical or second plane. Hinge 26 attaches along the length of foot 24. Sealing element 27 is attached along the top edge of leg 25.

Passage panel 28 is hingedly connected to frame 22. Passage panel 28 includes an h-shaped edge member 31 configured to have a first leg 32 attached near the outer edge 29 of passage panel 28, extending in a substantially perpendicular orientation from passage panel 28. Second leg 33 is shown attached to first leg 32 extending again in a substantially perpendicular manner to first leg 32.

As shown in FIG. 8A, weather tight passage 20 is oriented in closed weather tight orientation wherein passage panel 28 extends substantially parallel to foot 24 and therefore to the first plane defined by foot 24. In this orientation, the underside 30 of outer edge 29 of passage panel 28 compressively contacts sealing element 27 forming the weather tight seal.

Referring to FIG. 8B, passage panel 28 is shown in an up-opened orientation wherein the panel extends above and at an angle to the first plane defined by foot 24. Similarly, in FIG. 8C, passage panel 28 is shown pivoted along hinge 26 in a down-opened orientation wherein passage panel 28 extends below and at an angle to the first plane defined by foot 24.

Figure 9:
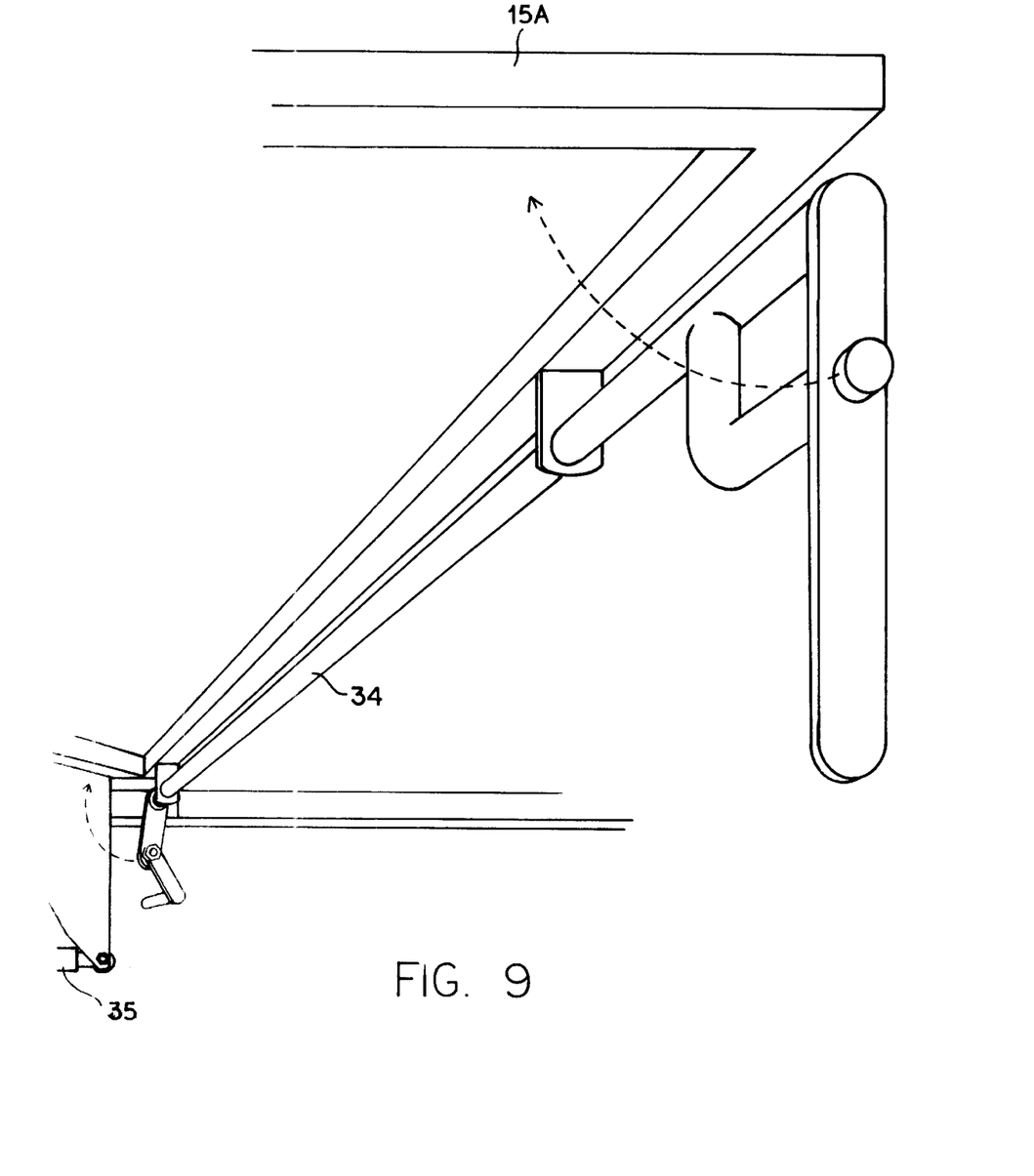
FIG. 9 is a perspective representational view of the roof passage door panel latch.

FIG. 9 is a perspective view showing first roof panel 15A including roof passage door panel latch 34. Roof passage door strut 35 is shown pivotally attached to an ear that extends below first roof panel 15A.

Figure 10A:
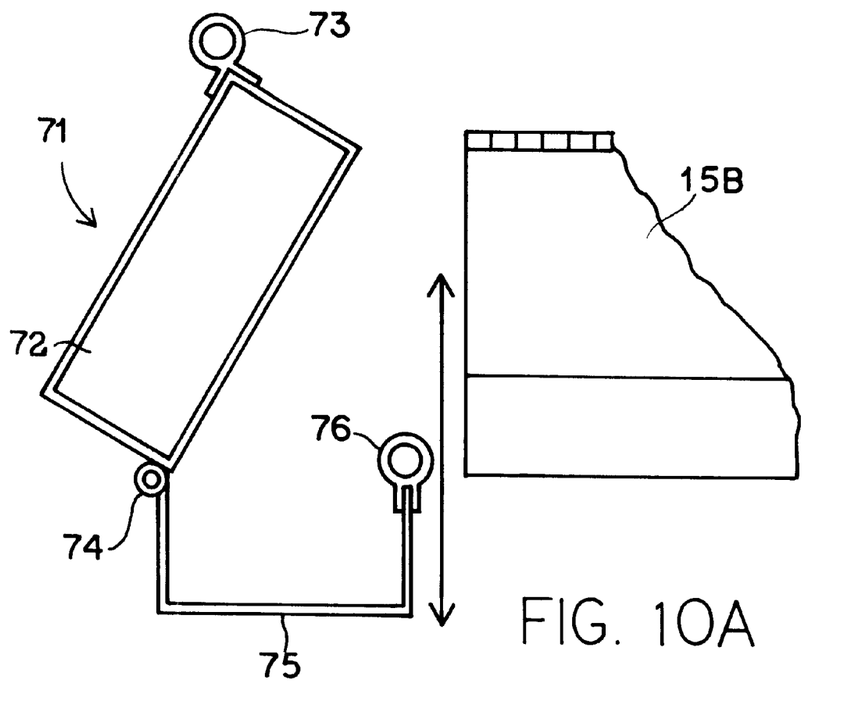
FIG. 10A is an end cross-sectional representational view of the flip seal according to the present invention in an opened orientation.

FIG. 10A shows front flip seal 71 including block 72 which pivots on hinge 74 and is connected thereby to jam 75. Front flip seal 71 includes passage door seal 73 and jam seal 76.

Figure 10B:
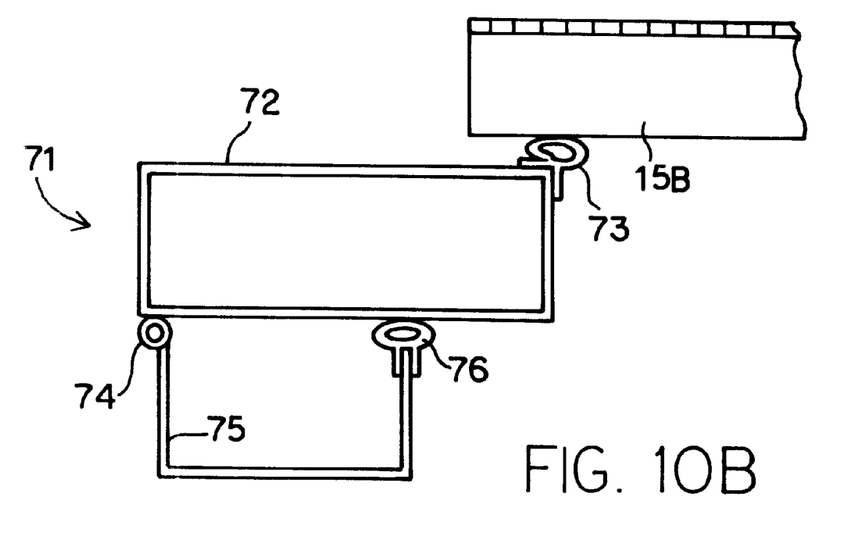
FIG. 10B is an end cross-sectional representational view of the flip seal in a lowered position.

FIG. 10B shows front flip seal 71 positioned such that, when second roof panel 15B is positioned in a first closed weather tight orientation, the underside of second panel 15B seals against passage door seal 73. FIG. 10B also shows front flip seal 71 including block 72 pivotally attached by hinge 74 to jam 75. The underside of block 72 seals against jam seal 76.

While there is shown and described the preferred embodiment of the invention, it is to be distinctly understood that this invention is not limited thereto but may be variously embodied to practice within the scope of the following claims.

I claim:

1. A weather tight passage comprising:
   a weather tight passage frame including an angular frame member including a foot extending in a first plane and a leg connected to the foot and extending in a second plane;
   a hinge attached to the angular frame member foot;
   a sealing element attached to the angular frame edge member leg; and
   a panel having an outer edge, the outer edge including an underside, the outer edge configured to have an h-shaped edge member including a first leg attached to the panel near the outer edge and extending from the panel, and a second leg attached to and extending from the first leg, the second leg lying in a plane substantially parallel to the panel outer edge, the h-shaped panel member second leg pivotally attached to the hinge, for movement between (1) a closed weather tight orientation wherein the panel extends substantially parallel to the first plane, with the panel outer edge substantially perpendicular to the angular frame member leg and the underside of the outer edge compressively contacting the sealing element, (2) an up-opened orientation wherein the panel extends above the first plane at an angle to the first plane, and (3) a down-opened orientation wherein the panel extends below the first plane at an angle to the first plane.

2. The weather tight passage of claim 1 further comprising a flip seal.

3. A cargo system for use with a vehicle having a bed, a longitudinal axis and a transverse axis, comprising:
   a pair of side panels;
   a pair of rear cargo panels, each rear cargo panel having a base and a top;
   a weather tight passage including a weather tight passage frame including an angular frame member having a foot extending in a first plane and a leg connected to the foot and extending in a second plane;
   a hinge attached to the angular frame member foot;
   a sealing element attached to the angular frame edge member leg; and
   a panel having an outer edge, the outer edge including an underside, the outer edge configured to have an h-shaped edge member including a first leg attached to the panel near the outer edge and extending from the panel, and a second leg attached to and extending from the first leg, the second leg lying in a plane substantially parallel to the panel outer edge, the h-shaped panel member second leg pivotally attached to the hinge, for movement between (1) a closed weather tight orientation wherein the panel extends substantially parallel to the first plane, with the panel outer edge substantially perpendicular to the angular frame member leg and the underside of the outer edge compressively contacting the sealing element, (2) an up-opened orientation wherein the panel extends above the first plane at an angle to the first plane, and (3) a down-opened orientation wherein the panel extends below the first plane at an angle to the first plane.

4. The cargo system of claim 3 wherein the weather tight passage further comprises a flip seal.

5. A cargo system for use with a vehicle having a truck bed, a longitudinal axis and a transverse axis, comprising:
   a pair of side panels;
   a pair of rear panels attached to and extending from the pair of side panels, each rear cargo panel having a base and a top;
   a roof panel attached to and extending from the side panels at an angle to the pair of side panels;
   a combination ramp/hatch passage including a rear passage frame including a first side frame element and a second side frame element an upper end and a lower end, an upper pivot release member having a first upper pivot release element and a second upper pivot release element, the first pivot release element attached at the upper end of the passage, a lower pivot release member having a first lower pivot release element and a second lower pivot release element, the first lower pivot release element attached at the lower end of the passage, a closure panel including an upper end, a lower end, a first side and a second side, the second upper pivot release element attached near the upper end of the closure panel for pivotably and releaseably engaging the first upper pivot release element and the second lower pivot release element attached near the lower end of the closure panel for pivotably and releaseably engaging the first lower pivot release element
   a weather tight passage including a weather tight passage frame including an angular frame member including a foot extending in a first plane and a leg connected to the foot and extending in a second plane;
   a hinge attached to the angular frame member foot;
   a sealing element attached to the angular frame edge member leg; and
   a panel having an outer edge, the outer edge including an underside, the outer edge configured to have an h-shaped edge member including a first leg attached to the panel near the outer edge and extending from the panel, and a second leg attached to and extending from the first leg, the second leg lying in a plane substantially parallel to the panel outer edge, the h-shaped panel member second leg pivotally attached to the hinge, for movement between (1) a closed weather tight orientation wherein the panel extends substantially parallel to the first plane, with the panel outer edge substantially perpendicular to the angular frame member leg and the underside of the outer edge compressively contacting the sealing element, (2) an un-opened orientation wherein the panel extends above the first plane at an angle to the first plane, (3) a down-opened orientation wherein the panel extends below the first plane at an angle to the first plane.

6. The cargo system of claim 5 further comprising a front flip seal.

* * * * *